(12) United States Patent
Hayden

(10) Patent No.: US 6,245,387 B1
(45) Date of Patent: Jun. 12, 2001

(54) CAPPED SILICONE FILM AND METHOD OF MANUFACTURE THEREOF

(75) Inventor: Don Hayden, Los Gatos, CA (US)

(73) Assignee: Diamon-Fusion International, Inc., San Juan Capistrano, CA (US)

( * ) Notice: Subject to any disclaimer, the term of this patent is extended or adjusted under 35 U.S.C. 154(b) by 0 days.

(21) Appl. No.: 09/185,202

(22) Filed: Nov. 3, 1998

(51) Int. Cl.[7] ........................................ B05D 1/36
(52) U.S. Cl. ................................ 427/341; 427/387
(58) Field of Search .................. 427/337, 340, 427/341, 387

(56) References Cited

U.S. PATENT DOCUMENTS

| | | | |
|---|---|---|---|
| 4,118,540 | 10/1978 | Amort et al. | 428/447 |
| 4,263,350 | 4/1981 | Valimont | 427/352 |
| 4,539,061 | * 9/1985 | Sagiv | 427/407.1 |
| 5,372,851 | 12/1994 | Ogawa et al. | 427/255.7 |
| 5,415,927 | 5/1995 | Hirayama et al. | 428/307.3 |
| 5,665,424 | 9/1997 | Sherman | 427/109 |
| 5,723,172 | 3/1998 | Sherman | 427/109 |
| 5,800,918 | 9/1998 | Chartier et al. | 428/336 |
| 5,853,896 | 12/1998 | Kondo et al. | 428/429 |

* cited by examiner

*Primary Examiner*—Erma Cameron
(74) *Attorney, Agent, or Firm*—Myers, Dawes & Andras LLP

(57) ABSTRACT

A silicone film is attached to a surface by chemical bonding. The silicone film consists of chains of siloxane groups, each chain terminating in an end molecule which is either an ester, an ether, or a halogen. The end molecule is allowed to react with water to produce an OH group. The surface is then contacted with a capping agent which reacts with the OH group to produce a new end group which improves the properties of the film.

35 Claims, 1 Drawing Sheet

CAPPED SILICONE FILM AND METHOD OF MANUFACTURE THEREOF

BACKGROUND OF THE INVENTION

1. Field of the Invention

This invention relates generally to silicone films, and more specifically to application of such films to glass and other surfaces.

2. Description of the Prior Art

Various methods exist for manufacturing easily cleanable, water repellent glass products, including shower doors, windshields, glass entry doors and glass partitions in restaurants. Two such methods are disclosed in U.S. Pat. No. 5,415,927 to Hirayama et et. and U.S. Pat. No. 4,263,350 to Valimont.

In another method currently in use, the glass is coated with a film consisting of chains of silicone molecules, with each chain chemically bound at one end to the surface of the glass. Each chain contains from dozens to hundreds of dimethylsiloxane (DMS) units and is terminated at its free end by either a hydroxyl (OH) group or a chlorine attached to a silicon, which soon reacts with water vapor in the air to produce OH groups. This existing film is in use on a number of glass products as well as other silica-containing products such as granite, porcelain, earthenware and stoneware, and for the most part, has performed satisfactorily. However, the water-repellence of the film is limited to some extent by the presence of the terminal OH groups, which are highly water-attracting.

Accordingly, it is an object of the present invention to improve the water-resistance of silicone films on glass, and to provide a support film for chemically active substances.

Another object of the invention is to produce a family of silicone films for treating a variety of products such as the silica-containing products previously mentioned as well as organic substances including paper, cotton, nylon, leather, and wood, in order to improve the surface properties of those products.

SUMMARY OF THE INVENTION

Briefly, to achieve the desired objects of the instant invention in accordance with the preferred embodiments thereof, a silicone film is attached to a surface by chemical bonding. The silicone film consists of chains of siloxane groups, each chain terminating in an end molecule which is either an ester, an ether, or a halogen. The end molecule is allowed to react with water, either water vapor in the surrounding air or by covering the surface with liquid water, to produce an end OH group. The surface is then contacted with a capping agent which reacts with the OH group to produce a new end group which improves the properties of the film.

The specific improvement in properties will depend on the siloxane groups used, as well as the composition of the capping agent. In general, the siloxane groups have the formula

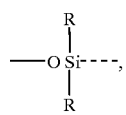

and the capping agent has the formula

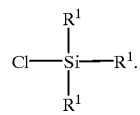

For water-repellent applications, R consists of nonpolar groups, and $R^1$ consists of inert groups. For non-water-repellent applications, R consists of polar or nonpolar groups. In other applications, $R^1$ could consist of chemically active groups, enabling the surface to be used as a solid state ion exchanger or an attachment point for chemically bound enzymes, chelating agents, dyes, chemical indicators or other substances.

BRIEF DESCRIPTION OF THE DRAWINGS

The foregoing and further and more specific objects and advantages of the instant invention will become readily apparent to those skilled in the art from the following detailed description of the preferred embodiments thereof taken in conjunction with the drawings in which.

DETAILED DESCRIPTION OF THE INVENTION

Figure 1:
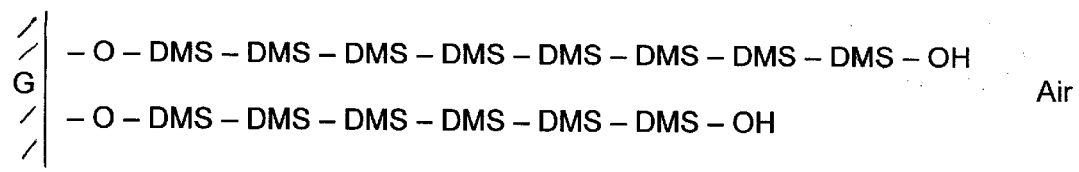
FIG. 1 is a diagrammatic representation of a surface coated with a prior art water-repellent film.

Turning now to the drawings, attention is first directed to FIG. 1, which shows a surface G which has been treated with a water-repellent film using a prior art process. In the most widely-used application of the process, the surface G is glass, but the process may actually be used to treat any surface containing OH or nitrogen hydrogen bonds, such as silica-containing surfaces including granite, porcelain, earthenware and stoneware, as well as organic substances including cotton, paper, nylon, leather and others. The film comprises chains of dimethylsiloxane (DMS) groups. Each chain is chemically bonded at one end to an oxygen (O) molecule, which in turn is chemically bonded to the surface G. The opposite end of each chain includes either a hydroxyl (OH) group or a chlorine attached to silicone, which will soon react with water vapor in the surrounding air to produce an OH group.

The process by which the film of FIG. 1 is created is as follows. Initially, the surface G is moistened. The moistened surface can be represented as shown in simplified form below:

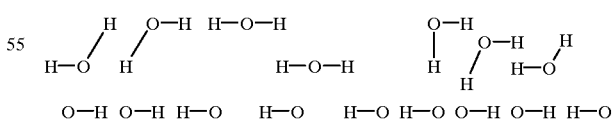

In reality, however, the number of H—O—H molecules at the surface would be much greater than the number of O—H groups on the surface (a ratio of about 100:1).

Next, the surface is treated with dimethyldichlorosilane using Portable Vapor machines which may be adapted to fixed site chambers for large volume operations, or by using a wipe-on method or a dipping or spraying procedure. Where necessary, cyclohexylamine is used as a primer to ensure sufficient moisture for the chemical reaction to take place. After the dimethyldichlorosilane has been applied, a dimethyldichlorosilane molecule approaches an O—H group at the surface, as shown below:

(a)

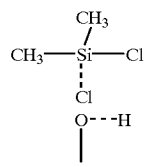

The ensuing reaction results in an anchor molecule which will chemically bond the film to the surface G, as shown below:

(b)

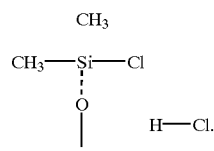

The Si—Cl bond then reacts with water absorbed on the surface G as follows:

(c)

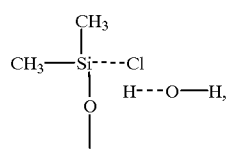

resulting in the following structure:

(d)

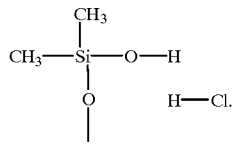

This structure then reacts with a DMS molecule as follows:

(e)

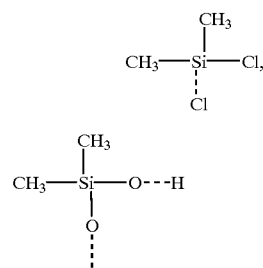

resulting in the molecule shown below:

(f)

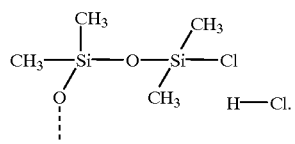

The process of steps (c)–(f) above is repeated about 100 times until no more water remains for steps (c) and (d). The product has the formula:

(g)

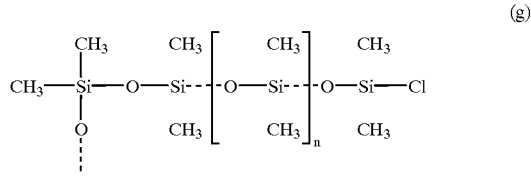

where n is around 100 or more. The groups in the brackets are highly water repellent. However, the chlorine atom at the end of the chain slowly reacts over several hours with water vapor in the air to result in a product having the formula:

(h)

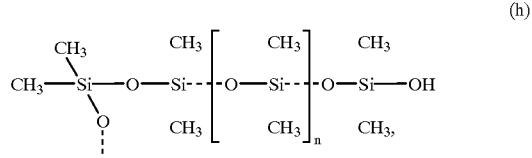

which is equivalent to the structure shown in FIG. 1. The Si—O—H group at the end of this final product is water-attracting, thus reducing the overall water repellence of the entire film, and creating a site for undesirable chemical reactions.

In the improved process of the instant invention, a surface coated with the above film is then treated with trimethylchlorosilane, which reacts with the OH group at the end of the DMS chain to produce trimethylchlorosiloxane (TMS). The final product is a film having the formula:

(i)

Figure 2:
FIG. 2 is a diagrammatic representation of a surface coated with a water-repellent film manufactured using the process of the present invention.

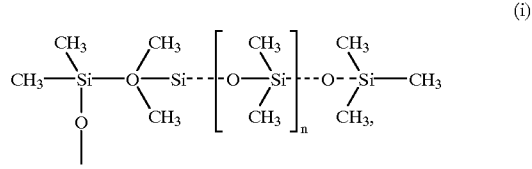

which is equivalent to the structure shown in FIG. 2. Because the TMS group at the end of the chain is chemically inert, the water-resistance of the film is much greater than that of the prior art film.

The silicone film produced by the process of steps (a)–(i) above is one specific example of the invention, intended for water-repellent applications. In a more general case, the moistened surface G is first contacted with silane groups having the formula

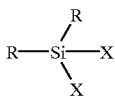

wherein R represents polar or nonpolar groups including hydrocarbons or halogenated hydrocarbons, and X is selected from the group consisting of esters, ethers, and halogens. The silane groups then react with the OH or nitrogen hydrogen bonds and water at the surface G to chemically bond the film to the surface G, in a process analogous to step (b) above. A series of reactions analogous to those shown in steps (b)–(f) above results in a polymer having the formula:

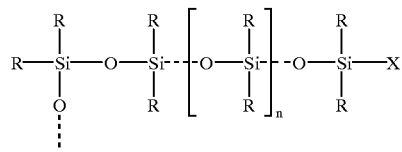

were n is around 100 or more. The X atom at the end of the chain then reacts with water vapor in the surrounding air resulting in a molecule having the formula:

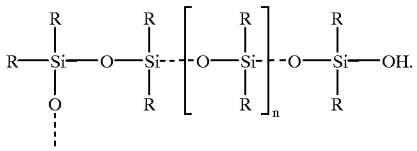

The surface is then contacted with a capping agent having the formula:

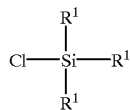

where $R^1$ may include any combination of inert and reactive groups. The capping agent reacts with the OH group at the end of the chain, resulting finally in a chain having the formula:

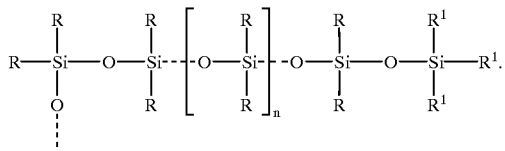

The properties of the film manufactured using this process will depend on the choice of R and $R^1$, and to a lesser extent, X. Choosing X from the chloro group gives the lowest material cost and gives a faster reaction time, while esters and ethers are less reactive but produce less troublesome coproducts and require different processing conditions.

In general, for water repellent applications, R consists of nonpolar groups and $R^1$ consists of chemically inert groups. If R consists of approximately 50% methyl groups and 50% phenyl groups, the abrasion-resistance of the film is improved. The abrasion-resistance of the film can also be improved by connecting the DMS chains with methyltrichlorosilane (which causes branched chains and additional ends). The methyltrichlorosilane would cause the chains to be tied together in a three-dimensional structure, which would resist abrasion better than a two-dimensional structure.

For non-water repellent applications, R consists of polar or nonpolar groups. If $R^1$ is selected from chemically reactive groups, the end molecule can provide an attachment point for enzymes, chelating agents, ion exchange elements, chemical indicators and other substances.

Various other modifications and variations to the embodiments herein chosen for purposes of illustration will readily occur to those skilled in the art. To the extent that such variations and modifications do not depart from the spirit of the invention, they are intended to be included within the scope thereof which is assessed only be a fair interpretation of the following claims.

What is claimed is:

1. A process for treating a surface of a substrate G containing OH or nitrogen-hydrogen bonds and being surrounded by air, the process including the steps of:

a) moistening the surface with water;

b) contacting the surface with silane molecules having the formula

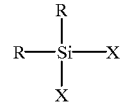

wherein
      R represents polar or nonpolar groups comprising hydrocarbons or halogenated hydrocarbons, and
      X is a unit selected from a group consisting of esters, ethers, and halogens;

c) allowing the silane molecules to react with the OH or nitrogen-hydrogen bonds and water to create a first molecule having the formula

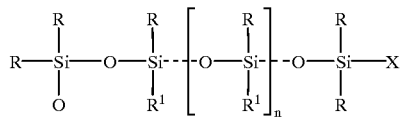

d) allowing the X unit at the end of the first molecule to react with the water to produce a second molecule having a structure

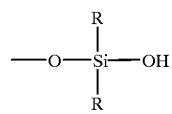

at the end of the first molecule;

e) contacting the surface with a capping agent having the formula

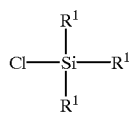

wherein
R¹ may include any combination of inert and reactive groups; and f) allowing the capping agent to react with the molecule to result in a new molecule having the formula

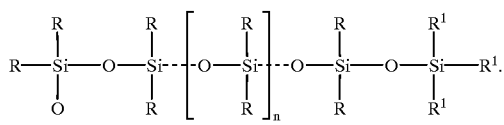

2. The process according to claim 1, wherein the substrate G includes silica molecules.

3. The process according to claim 2, wherein the substrate G is formed from a material selected from the group consisting of glass, ceramics and silica-containing minerals.

4. The process according to claim 1, wherein the substrate G includes organic molecules.

5. The process according to claim 1, wherein R is methyl.

6. The process according to claim 1, wherein R is selected from a group consisting of phenyl, ethyl, methyl, butyl, amyl, and alkyl groups.

7. The process according to claim 1, wherein R comprises about 50% methyl groups and 50% phenyl groups.

8. The process according to claim 1, wherein R consists of polar groups.

9. The process according to claim 1, wherein R consists of nonpolar groups.

10. The process according to claim 1, wherein R¹ consists of chemically inert groups.

11. The process according to claim 1, wherein R¹ consists of chemically reactive groups.

12. The process according to claim 1, wherein the step of contacting the surface with silane molecules comprises chemically depositing the silane molecules on the surface using a vapor machine.

13. The process according to claim 1, wherein the step of contacting the surface with silane groups comprises a wipe-on method.

14. The process according to claim 1, wherein the step of contacting the surface with silane groups comprises a dipping or spraying procedure.

15. The process according to claim 1, wherein the step of moistening the surface comprises a step of priming the surface with cyclohexylamine.

16. A process for manufacturing water-resistant glass in an environment including air, comprising the steps of:
a) coating the glass with a film formed of a first molecule chemically bonded with the glass and having the formula

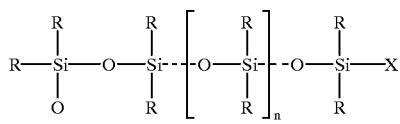

wherein

R consists of nonpolar groups, X is a unit selected from the group consisting of esters, ethers and halogens; and b) allowing the X unit at the end of the first molecule to react with water to produce a second molecule having the structure

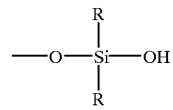

at the end of the second molecule; and c) contacting the surface with a capping agent having the formula

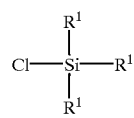

wherein
R¹ consists of inert groups; and d) allowing the capping agent to react with the second molecule to result in a water-resistant film formed from a new molecule having the formula

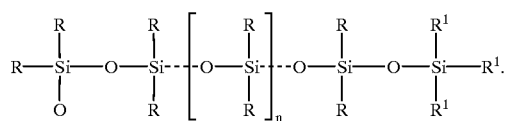

17. The process according to claim 16, wherein the water-resistant film comprises chains of dimethylsiloxane.

18. The process according to claim 16, wherein the capping agent is trimethylchlorosilane.

19. The process according to claim 16, wherein R is selected from a group consisting of phenyl, ethyl, methyl, butyl, amyl and alkyl groups.

20. The method according to claim 16, wherein R comprises about 50% methyl groups and 50% phenyl groups.

21. A process for treating a surface of a substrate G containing OH or nitrogen-hydrogen bonds and surrounded by air, the process including the steps of:
a) moistening the surface with water;
b) contacting the surface with a first molecule having the formula

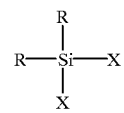

wherein
R consists of polar or nonpolar groups, and
X is unit selected from the group consisting of esters, ethers and halogens;

c) allowing the first molecule to react with the OH or nitrogen-hydrogen bonds and water at the surface to create a film including a second molecule having the formula

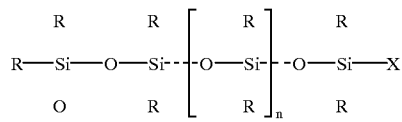

wherein
the film is chemically bonded to the surface;
d) allowing the X unit at the end of the second molecule to react with water to produce a third molecule having the structure

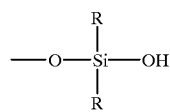

at the end of the third molecule; and
e) contacting the surface with a capping agent having the formula

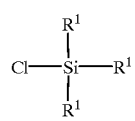

wherein
$R^1$ consists of chemically active groups; and
f) allowing the capping agent to react with the third molecule to result in a new end structure having the formula

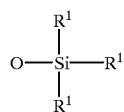

wherein
the third molecule with the new end structure serves as a solid state ion exchanger or attachment point.

22. The process according to claim 21, wherein the substrate G includes silica molecules.

23. The process according to claim 22, wherein the substrate G is formed from a material selected from the group consisting of glass, ceramics, and silica-containing minerals.

24. The process according to claim 21, wherein the substrate G includes organic molecules.

25. The process according to claim 21, wherein R is methyl.

26. The process according to claim 21, wherein the film consists of chains of dimethylsiloxane.

27. In a process of manufacturing a water-resistant film for protecting a surface G containing OH or nitrogen-hydrogen bonds, wherein the process comprises the steps of:
a) coating the surface G with a polymer having i) an anchor group with the formula

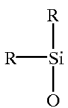

wherein
Si is a silicone atom, and
R comprises nonpolar groups;
ii) a chain of siloxane groups, the chain having a first end and a second end, the first end of the chain being chemically bound to the silicon atom of the anchor group, the chain having the formula; and

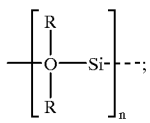

and
iii) a terminal group of atoms chemically bound to the second end of the chain, the terminal group having the formula

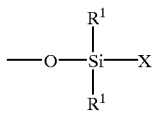

wherein
$R^1$ comprises inert groups, and
X is a unit selected from a group consisting of esters, ethers and halogens;
b) allowing the X unit of the terminal group to react with water in the surrounding air to produce a new terminal group having the formula

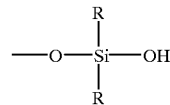

c) replacing the new terminal group with a final terminal group having the structure

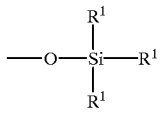

wherein
$R^1$ comprises inert groups.

28. The improvement according to claim 27, wherein the siloxane groups consist of dimethylsiloxane groups.

29. The improvement according to claim 28, wherein the final terminal group consists of a trimethylsiloxane group.

30. The improvement according to claim 27, wherein $R^1$ is the same as R.

31. The improvement according to claim 27, wherein R is selected from a group consisting of phenyl, ethyl, methyl, butyl, amyl, and alkyl groups.

32. The improvement according to claim 27, wherein the step of replacing the new terminal group comprises the substeps of;

a) contacting the surface with a capping agent having the formula

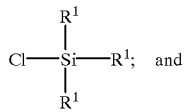; and b) allowing the capping agent to react with the new terminal group to result in an inert final terminal group.

33. A process for treating a surface of a substrate G containing OH or nitrogen hydrogen bonds and surrounded by air, the process including the steps of;

a) moistening the surface with water, b) contacting the surface with silane groups having the formula

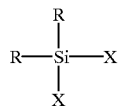

wherein

R represents polar or nonpolar groups comprising hydrocarbons or halogenated hydrocarbons, and X is selected from the group consisting of esters, ethers, and halogens;

c) allowing the silane groups to react with the OH or nitrogen hydrogen bonds and water at the surface to create a film formed of chains having the formula

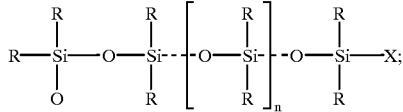

d) allowing the X unit at the end of the chain to react with water in the surrounding air to produce a molecule having the structure

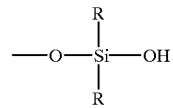

at the end of the chain; and e) contacting the surface with a capping agent having the formula

Y—Z wherein

Y is a carrier molecule; and

Z is a terminal group of the capping agent, and f) allowing the capping agent to react with the molecule to result in a new molecule chain having the formula

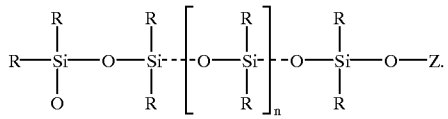

34. The process recited in claim 33 wherein the carrier molecule Y of the capping agent is chlorine.

35. The process recited in claim 34 wherein the terminal group Z of the capping agent has the formula

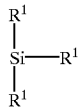

wherein $R^1$ may include any combination of inert and reactive groups.

* * * * *